United States Patent [19]

Itoh et al.

[11] Patent Number: 5,396,372
[45] Date of Patent: Mar. 7, 1995

[54] AUDIO SIGNAL RECORDING AND REPRODUCING APPARATUS

[75] Inventors: Shigeyuki Itoh, Yokohama; Yoshizumi Watatani, Fujisawa, both of Japan

[73] Assignee: Hitachi, Ltd., Tokyo, Japan

[21] Appl. No.: 548,830

[22] Filed: Jul. 6, 1990

[30] Foreign Application Priority Data

Jul. 7, 1989 [JP] Japan .................. 1-174012

[51] Int. Cl.6 .............................................. G11B 5/02
[52] U.S. Cl. .................... 360/19.1; 360/20; 360/30; 360/61; 348/482; 358/343
[58] Field of Search ............... 360/30, 27, 19.1, 68, 360/20, 21; 369/86, 61; 358/343, 318; 348/479, 480, 481, 482, 483

[56] References Cited

U.S. PATENT DOCUMENTS

3,902,007 8/1975 Justice ........................... 348/482
3,916,092 10/1975 Justice ........................ 348/483 X Primary Examiner—Andrew L. Sniezek
Attorney, Agent, or Firm—Antonelli, Terry, Stout & Kraus

[57] ABSTRACT

There is provided an audio signal magnetic recording and reproducing apparatus in which a frequency modulated luminance signal and a frequency modulated audio signal are sequentially recorded and reproduced onto-/from the same magnetic tape as recording loci each having predetermined angle of inclination for the tape running direction by a plurality of rotary heads having different azimuth angles, wherein the apparatus increases a recording level of the frequency modulated audio signal for the vertical sync signal period of the luminance signal.

14 Claims, 8 Drawing Sheets

(a) REPRODUCED FM AUDIO SIGNAL

(b) OUTPUT OF ENVELOPE DETECTION CIRCUIT 74

(c) HEAD SWITCHING SIGNAL (d) CONTROL SIGNAL OF S/H CIRCUIT 76

(e) CONTROL SIGNAL OF S/H CIRCUIT 77

AUDIO SIGNAL RECORDING AND REPRODUCING APPARATUS

BACKGROUND OF THE INVENTION

1. Field of the Invention

The present invention relates to an audio signal recording and reproducing apparatus in which an audio signal is frequency modulated (FM modulation) and recorded onto a magnetic tape.

In a VTR (Video Tape Recorder) in which a video signal is recorded onto a magnetic tape, in order to improve the sound quality of an audio signal which is recorded simultaneously with the recording of the video signal, a method whereby the audio signal is frequency modulated and multiplexingly recorded between the band of a luminance signal which was frequency modulated and the band of a chrominance signal which was low band converted has been shown in U.S. patent Ser. No. 4,490,753. According to the method shown in the above U.S. patent, since the reproduced sound quality can be remarkably improved, various audio signals such as stereophonic audio signals, double-audio signals, and the like can be recorded. Therefore, it is necessary to discriminate which audio signal such as monaural audio signal, stereophonic audio signals, double-audio signals, or the like has been recorded on the recorded magnetic tape. However, in the above conventional technique, no consideration is paid to such a point.

SUMMARY OF THE INVENTION

It is an object of the present invention to provide a recording and reproducing apparatus in which an audio signal is frequency modulated and recorded and reproduced, wherein the content of the recorded signal is discriminated.

To accomplish the above object, according to the invention, there is provided a recording and reproducing apparatus comprising: means for increasing an FM audio signal recording level for a vertical sync signal period of a luminance signal which is simultaneously recorded when bilingual audio signals are recorded; first detecting and holding means for detecting and holding reproduced FM audio signal amplitude level for the vertical sync signal period upon reproduction; second detecting and holding means for detecting and holding a reproduced FM audio signal amplitude level for a period other than the vertical sync signal period; level comparing means for comparing an output level of the first detecting and holding means and an output level of the second detecting and holding means; and means for controlling a matrix circuit for processing the audio signal in accordance with an output of the level comparing means.

In the case of recording bilingual audio signals, the FM audio signal recording level for the vertical sync signal period is set to be higher than those for the other periods and the bilingual audio signal is recorded. Thus, an envelope of the reproduced FM audio signal is detected and the amplitude level for the vertical sync signal period is detected and held by the first detecting and holding means. The amplitude level for the same period as the vertical sync signal period is held by the second detecting and holding means in response to the trailing edge of the vertical sync signal. By comparing the first and second levels which were held, the content of the recorded audio signal can be discriminated. By using the above method, it is possible to prevent an erroneous discrimination due to a fluctuation in reproduction level which occurs due to a curved track upon compatible reproduction or the like. On the other hand, a display circuit and a matrix circuit can be controlled on the basis of the result of the level discrimination.

DESCRIPTION OF THE PREFERRED EMBODIMENTS

Figure 1:
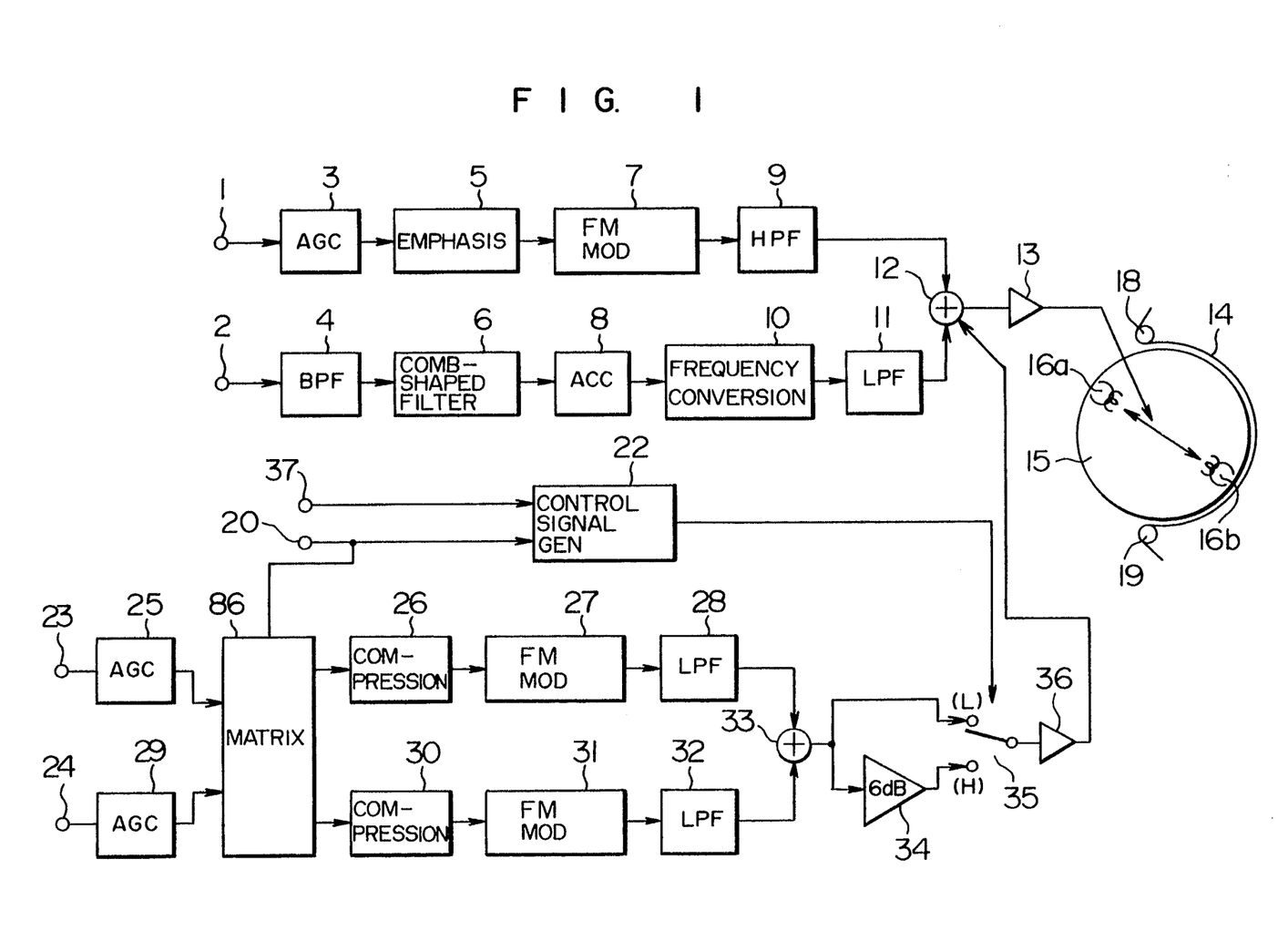
FIG. 1 is a block diagram showing an embodiment of a recording system of the invention.

An embodiment of the present invention will be described hereinbelow with reference to FIG. 1. FIG. 1 shows an example of a recording system in the case where the invention was applied to a helical scanning type VTR in which a frequency modulated audio signal (FM audio signal) is frequency multiplexed to a luminance signal which was frequency modulated (FM luminance signal) and a chrominance signal which was low band converted (low band converted chrominance signal) and recorded onto magnetic tape by the same magnetic head.

The luminance signal which was input from an input terminal 1 is supplied to an automatic gain controller (AGC) 3, by which an amplitude level is corrected. After that, a high frequency component is emphasized by an emphasis circuit 5. After an output signal of the emphasis circuit 5 was frequency modulated by a frequency modulator 7, unnecessary band components are eliminated by a high pass filter (HPF) 9, so that the FM luminance signal is obtained.

On the other hand, a chrominance signal which was input from an input terminal 2 is supplied to a band pass filter (BPF) 4 and a comb-shaped filter 6 and a chrominance signal band component is extracted by the filters 4 and 6. After that, a chrominance signal level is regulated by an automatic color level controller (ACC) 8. An output chrominance signal of the ACC 8 is frequency converted into a low frequency band signal by a frequency converting circuit 10. Unnecessary band components are eliminated by a low pass filter (LPF) 11, so that the low band converted chrominance signal is obtained.

On the other hand, the audio signals are respectively input from input terminals 23 and 24 and their levels are adjusted by AGCs 25 and 29 and, after that, they are input to a matrix circuit 86.

In the case where the input signals are stereophonic audio signals, the matrix circuit 86 forms a sum signal (L+R signal) of the right side signal (R signal) which is input from the input terminal 23 and the left side signal (L signal) which is input from the input terminal 24 and a difference signal (L−R signal).

In the case where the input signals are bilingual audio signals, a main audio signal which is input from the input terminal 23 and a sub audio signal which is input from the input terminal 24 are directly output from the matrix circuit 86.

The operation of the matrix circuit 86 is controlled by a stereo/bilingual switching signal which is input from an input terminal 20. An output signal of the matrix circuit 86 is transmitted through compressing circuits 26 and 30 each for compressing a dynamic range into $\frac{1}{2}$. After that, the signals are frequency modulated by frequency modulators 27 and 31 at carrier center frequencies of 1.5 MHz and 1.7 MHz, respectively, and unnecessary band components are eliminated by LPFs 28 and 32, so that FM audio signals of the carrier center frequencies of 1.5 MHz and 1.7 MHz are obtained. The reason why the dynamic ranges are compressed is because the generation of noises due to a crosstalk signal from the adjacent track is effectively prevented by increasing a frequency modulation ratio.

After the FM audio signals which had been output from the LPFs 28 and 32 were added by an adding circuit 33, either one of the signal whose amplitude level was doubled by passing through a 6 dB amplifier 34 and the signal which is not transmitted through the 6 dB amplifier 34 is selected by a switch 35. The selected signal is output to an adder 12 through a buffer amplifier 36.

The adder 12 adds (frequency multiplexes) the FM luminance signal, low band converted chrominance signal, and FM audio signal. The added signal passes through recording amplifier 13 and is sequentially recorded onto a magnetic tape 14 by magnetic heads 16a and 16b attached to a cylinder 15.

A control signal generating circuit 22 generates a control signal from the stereo/bilingual switching signal which is input from the input terminal 20 and a head switching signal of the rotary heads 16a and 16b which is input from an input terminal 37. The switching state of the switch 35 is controlled by the control signal. By the above control, the signal which passed through the 6 dB amplifier 34 is output for a period of time which is almost equal to the vertical sync signal period of the luminance signal which is simultaneously recorded (on the (H) side of the switch 35). The signal which is not transmitted through the 6-dB amplifier 34 is output for the other periods (on the (L) side of the switch 35).

Figure 2:
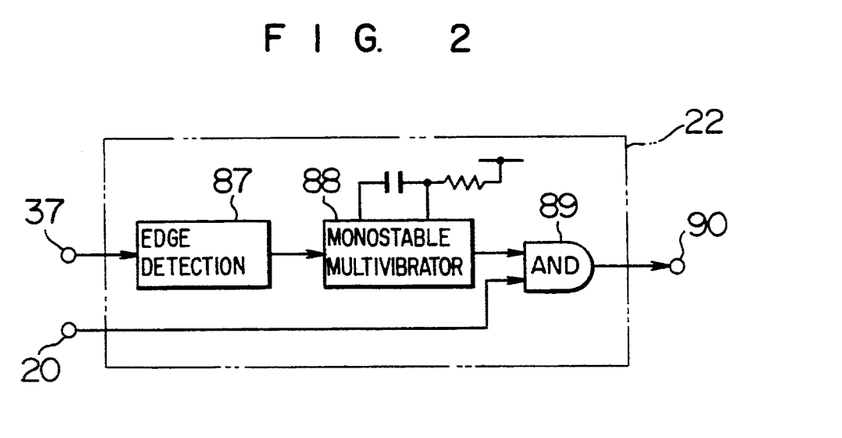
FIG. 2 is an arrangement diagram showing an example of a practical construction of FIG. 1.
Figure 3:
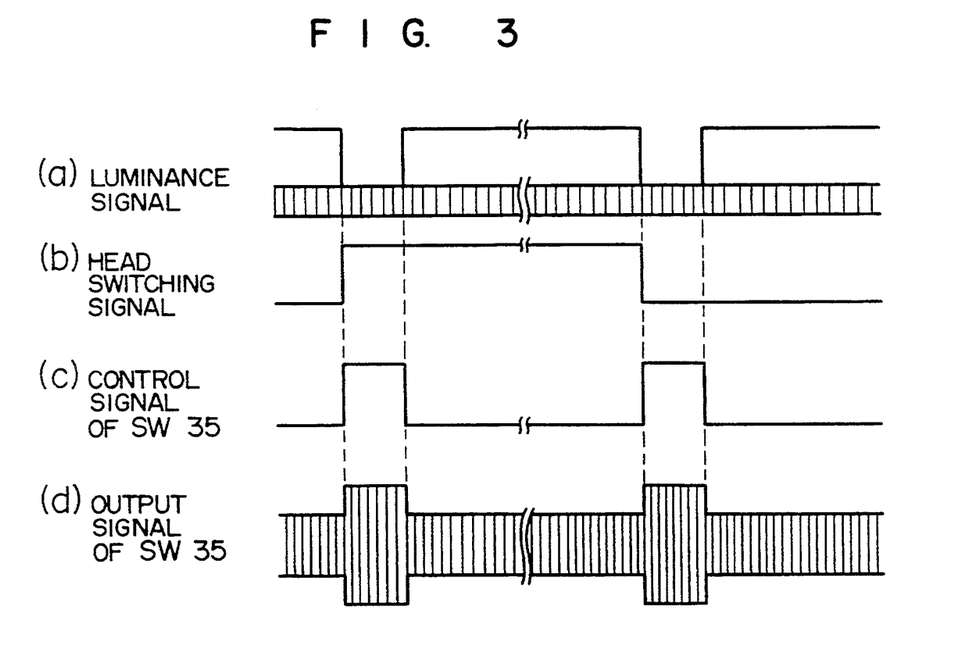
FIG. 3 is a waveform diagram for explaining the operation of FIG. 1.

A practical example of the control signal generating circuit 22 is shown in FIG. 2. In FIG. 2, since there is a predetermined phase relation between the head switching signal which is input from the input terminal 37 and the vertical sync signal is shown in FIGS. 3(a) and 3(b), both edges of the head switching signal are detected by an edge detecting circuit 87 and pulses corresponding to the vertical sync period are generated from a monostable multivibrator 88 as shown in FIG. 3(c). The pulses generated are output from an output terminal 90 to the switch 35 through an AND circuit 89 when the stereo/bilingual switching signal which is input from the input terminal 20 indicates the bilingual, that is, when the input signal of the input terminal 20 is set to the high level. Thus, as shown in FIG. 3(d), when the bilingual signals are recorded, the switch 35 is set to the (H) side for the period of time corresponding to the vertical sync signal and the amplitude level of an output signal of the switch 35 or the FM audio signal is doubled.

Therefore, in the case of recording the bilingual audio signals, the amplitude level of the FM audio signal is doubled and the recording level is raised only for the recording period of time of the vertical sync signal of the luminance signal which is simultaneously recorded.

Generally, in the case where the FM luminance signal, low band converted chrominance signal, and FM audio signal are frequency multiplexed or overlap recorded (the FM audio signal is first recorded and the FM luminance signal and the low band converted chrominance signal are subsequently overlappingly recorded on the FM audio signal), unless the recording level of the FM audio signal is set to a predetermined level or less, a beat or various noises appear on the reproduced video signal, so that the picture quality deteriorates. However, as in the present invention, for the vertical sync signal period of time, an interference by the FM audio signal does not occur on the television screen. Thus, the discrimination information to discriminate between the stereo/bilingual signals can be replaced to the high and low recording levels of the FM audio signal.

In the embodiment of FIG. 1, the pulses corresponding to the vertical sync signal period of time have been generated (FIG. 3(c)) on the basis of the head switching signal. However, it is also possible to directly separate the vertical sync signal from the sync signal of the luminance signal to be recorded and to use the separated vertical sync signal. On the other hand, in FIG. 1, although the recording level of the FM audio signal has been increased by 6 dB for the vertical sync signal period of time of all of the fields, the recording level can be also increased for the vertical sync signal periods of every other field or every two other fields instead of all of the fields. An example of the reproducing system will now be described with reference to FIG. 4.

The video system will be first explained.

Figure 4:
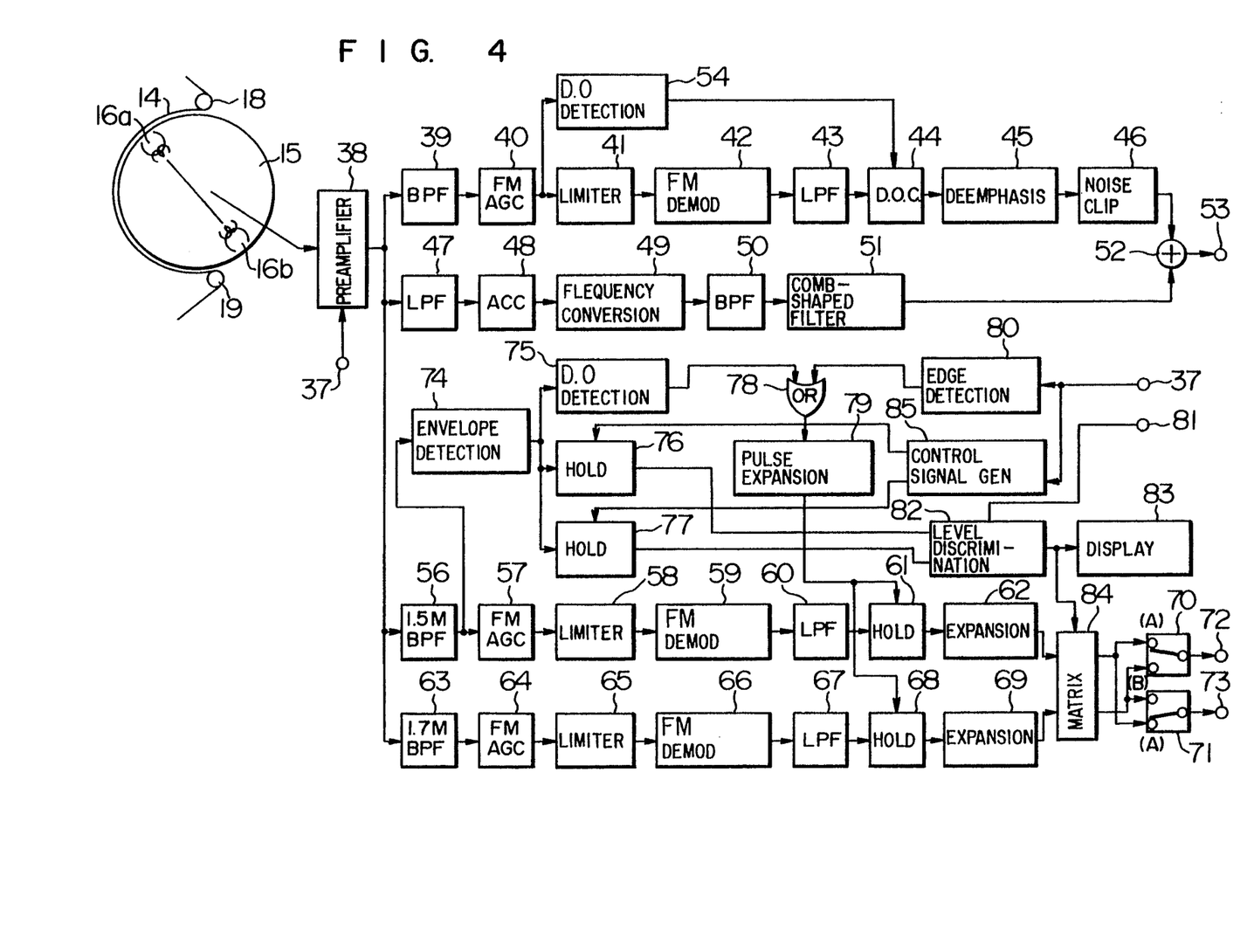
FIG. 4 is a block diagram showing an embodiment of a reproducing system.

The signals reproduced from the magnetic tape 14 by the rotary magnetic heads 16a and 16b attached to the cylinder 15 are constructed to a series of reproduced signals by a preamplifier 38 on the basis of the head switching signal which is input from the input terminal 37. After that, the reproduced FM luminance signal band is extracted by a BPF 39 and the reproduced low band converted chrominance signal is extracted by an LPF 47.

The reproduction level fluctuation of the extracted reproduced FM luminance signal is corrected by an FMAGC 40 and, after that, the FM luminance signal is frequency demodulated into the reproduced luminance signal by a limiter 41, a frequency demodulator 42, and an LPF 43. Then, the noises are eliminated by a deemphasis circuit 45 and a noise clip 46 and the resultant signal is output to an adder 52.

After the reproduced signal level fluctuation of the extracted reproduced low band converted chrominance signal was corrected by an ACC 48, the signal is converted from the low band converted chrominance signal to the original high band chrominance signal by a frequency converting circuit 49 and a BPF 50. After that, an interference signal from the adjacent track and noise components are eliminated by a comb-shaped filter 51 and the resultant signal is output to the adder 52.

The adder 52 adds the reproduced luminance signal and the reproduced chrominance signal and outputs as a reproduced color signal from an output terminal 53.

On the other hand, from an output signal of the preamplifier 38, the FM audio signal of 1.5 MHz and the FM audio signal of 1.7 MHz are extracted by a BPF 56 of 1.5 MHz and a BPF 63 of 1.7 MHz, respectively. The reproduction level fluctuations of the extracted FM audio signals are corrected by FMAGCs 57 and 64, respectively. After that, the corrected FM audio signals are frequency demodulated by limiters 58 and 65, frequency demodulators 59 and 66, and LPFs 60 and 67, respectively, so that demodulated audio signals are derived.

In case the demodulated audio signals include the noise due to discontinuous phase of the reproduced FM waves which are generated upon switching of the rotary heads and the noises by the signal dropout, the signals are compensated by holding the values just before the noises are generated for the noise generating period of time by means of previous value holding circuits 61 and 68.

The previous value holding circuits 61 and 68 are controlled by an output signal of a pulse width expanding circuit 79. The amplitude level of the reproduced FM audio signal is detected by an envelope detecting circuit 74. A signal dropout is detected by a dropout detecting circuit (D.O. detecting circuit) 75 from an output signal of the envelope detecting circuit 74. The pulse width expanding circuit 79 generates a control signal on the basis of an output signal of the D.O. detecting circuit 75 and the signal obtained by detecting both edges by an edge detecting circuit 80 from the head switching signal which is input from the input terminal 37.

Figure 5:
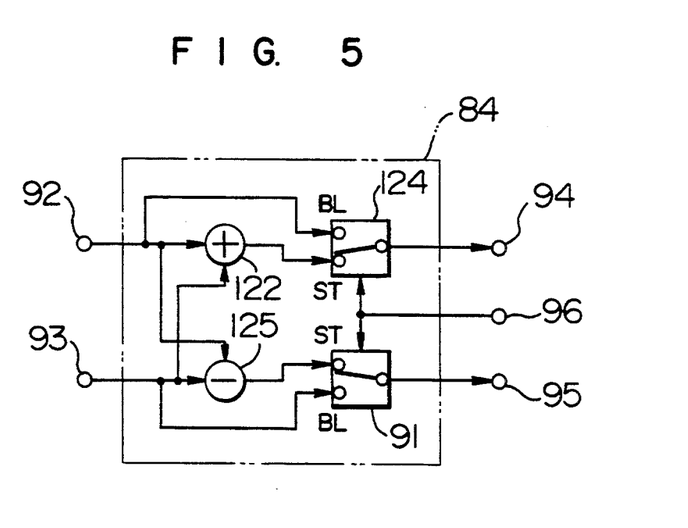
FIG. 5 is an arrangement diagram showing an example of a practical construction of FIG. 4.

Output signals of the previous value holding circuits 61 and 68 are expanded by expanding circuits 62 and 69 each for returning the dynamic range which was compressed upon recording to the original level. After that, the expanded output signals are input to a matrix circuit 84. The matrix circuit 84 is controlled by an output signal of a level discriminating circuit 82 to discriminate whether the audio signals recorded are the stereophonic audio signals or bilingual audio signals. An output signal of the matrix circuit 84 is input to switches (SW) 70 and 71 to switch the output and is output from output terminals 72 and 73. The switches 70 and 71 are connected to the (A) side when the stereophonic audio signals and the main audio signal are output. The switches 70 and 71 are connected to the (B) side when the sub audio signal is output. FIG. 5 shows a practical example of the matrix circuit 84. When the stereophonic audio signals are reproduced, the addition and subtraction are executed by an adder 122 and a subtracter 89 with respect to a demodulated sum signal (L+R signal) and a demodulated difference signal (L−R signal) which were input from input terminals 92 and 93, thereby obtaining an L signal and an R signal. The L and R signals are output from output terminals 94 and 95 through the ST side of each of switches 124 and 91.

The switches 124 and 91 are controlled by an output signal of the level discriminating circuit 82 which is input from an input terminal 96. The switches 90 and 91 are connected to the ST side in the case of the stereophonic audio signals and are connected to the BL side in the case of the bilingual audio signals. On the other hand, when the bilingual audio signals are reproduced, the demodulated main audio signal and the demodulated sub audio signal which are input from the input terminals 92 and 93 are directly output from the output terminals 94 and 95 through the BL side of each of the switches 90 and 91.

A method of discriminating whether the recorded audio signals are the stereophonic audio signals or the bilingual audio signals will now be described.

Figure 6:
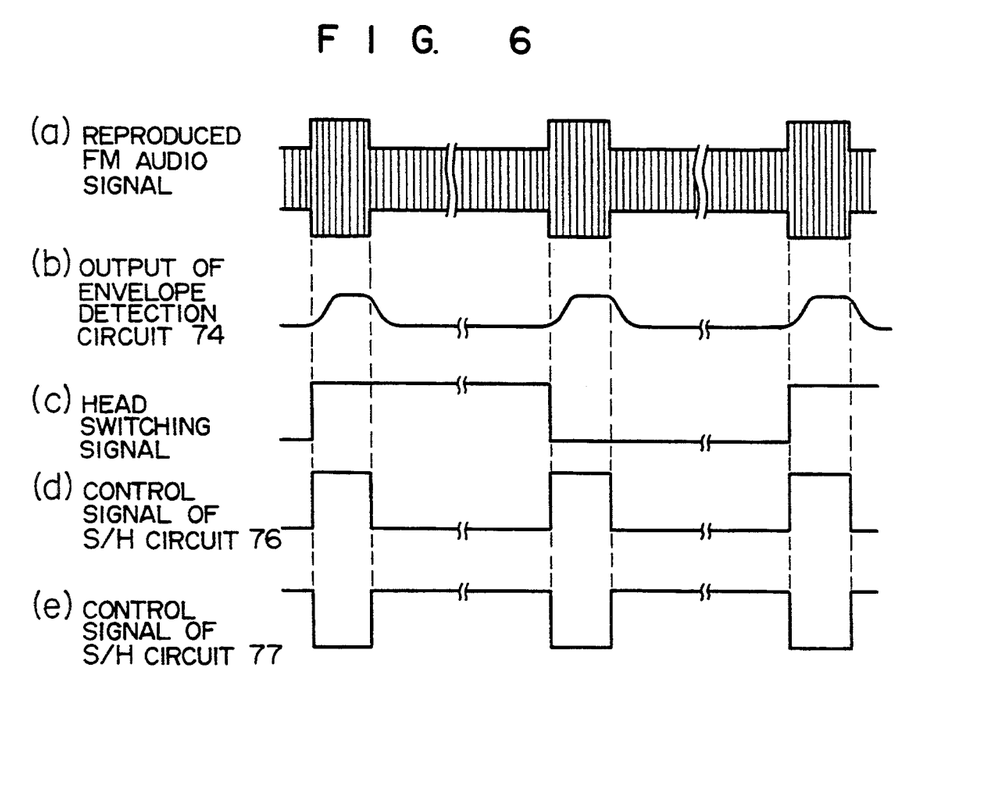
FIG. 6 is a waveform diagram for explaining the operation of FIG. 4.

As mentioned above, in the case of recording the bilingual audio signals in the recording mode, the recording level of the FM audio signal has been increased by 6 dB (doubled) for the vertical sync signal period of the luminance signal. Therefore, the content of the recorded audio signals can be discriminated by detecting the amplitude level for the vertical sync signal period of the reproduced FM audio signal. That is, in FIG. 4, when the bilingual audio signals are reproduced, the output signal of the BPF 56 of 1.5 MHz is as shown in FIG. 6(a) and an output signal of the envelope detecting circuit 74 to detect the amplitude level of the reproduced FM audio signal is as shown in FIG. 6(b). To detect the reproduced FM audio signal amplitude level for the vertical sync signal period, on the basis of the head switching signal (FIG. 6(c)) which is input from the input terminal 37, two kinds of control signals shown in FIGS. 6(d) and 6(e) are generated from a control signal generating circuit 85. On the basis of the control signals (FIGS. 6(d) and 6(e)), the signal level shown in FIG. 6(b) is held by sample and hold circuits 76 and 77. The signal levels held in the sample and hold circuits 76 and 77 are discriminated by the level discriminating circuit 82, thereby discriminating whether the recorded audio signals are the stereophonic audio signals or the bilingual audio signals.

The result of the discrimination by the level discriminating circuit 82, that is, the content of the stereo/bilingual audio signals is displayed by a display circuit 83 and a signal indicative of the result is used as a control signal of the matrix circuit 84.

In a variable speed reproducing mode such as what is called a search mode, a still mode, or the like, the level discriminating circuit 82 cannot execute the level discrimination. Therefore, the output signal is held on the basis of a variable speed reproducing mode signal which is input from an input terminal 81. That is, the output signal before the start of the variable speed reproducing mode is output for a period of time of the variable speed reproducing mode.

Figure 7:
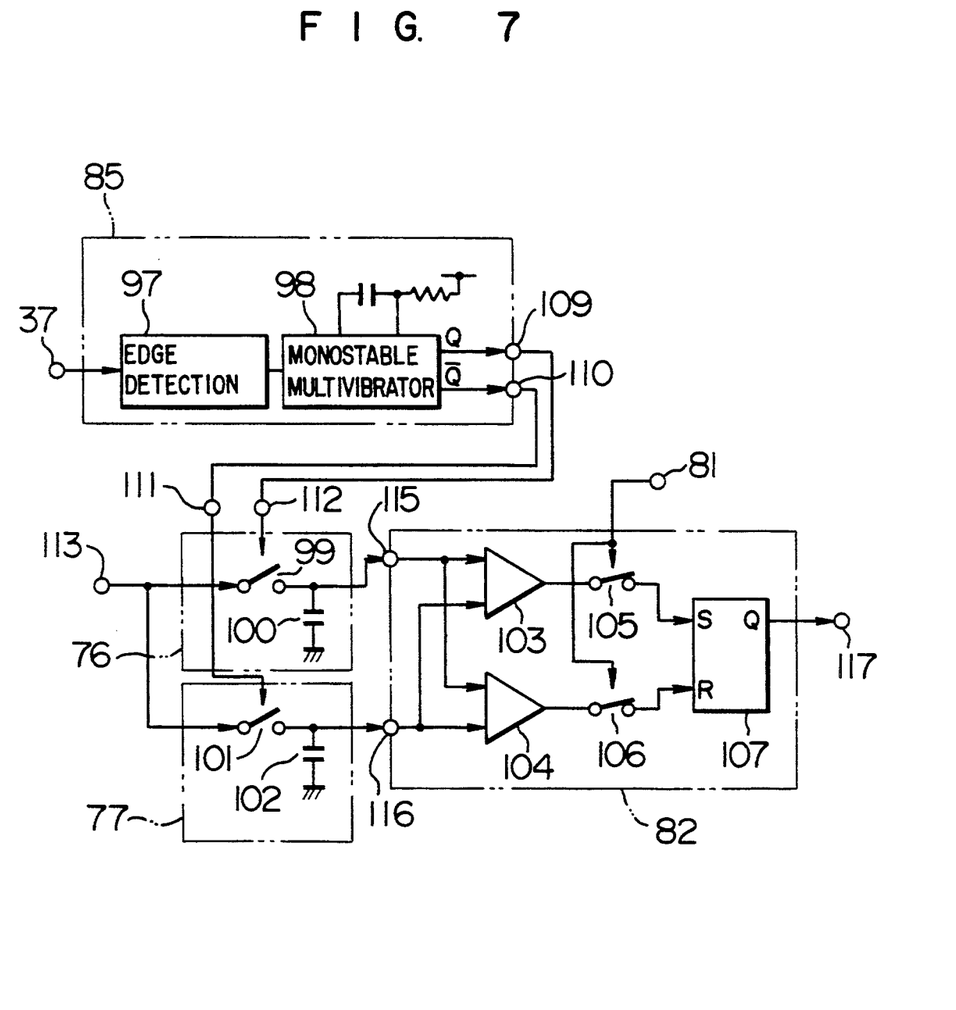
FIG. 7 is an arrangement diagram showing an example of a practical construction of FIG. 4.

FIG. 7 shows a practical example of the simple and hold circuits 76 and 77, level discriminating circuit 82, and control signal generating circuit 85. After both edges of the head switching signal which had been input from the input terminal 37 were detected by an edge detecting circuit 97, pulse signals shown in FIGS. 6(d) and 6(e) are output from Q and $\bar{Q}$ terminals of a monostable multivibrator 98 on the basis of both of the detected edges.

An output signal of the envelope detecting circuit 74 is input from an input terminal 113 and is sampled and held by the sample and hold circuits 76 and 77 comprising switches 99 and 101 and capacitors 100 and 102 on the basis of an output signal of the monostable multivibrator 98.

The levels of the signals held by the sample and hold circuits 76 and 77 are compared by comparators 103 and 104. After that, the signals are transmitted through switches (SW) 105 and 106 and are input to a set-reset type flip-flop circuit 107. The results of the level comparison of the comparators 103 and 104 are stored into the flip-flop 107 and output from an output terminal 117. (In the case of the bilingual audio signals, the output level of the output terminal 117 is set to the high level.) For the variable speed reproducing mode period of time, the switches 105 and 106 are opened by the variable speed reproducing mode signal which is input from the input terminal 81, thereby preventing that the output results of the comparators 103 and 104 are input to the flip-flop 107.

Figure 8:
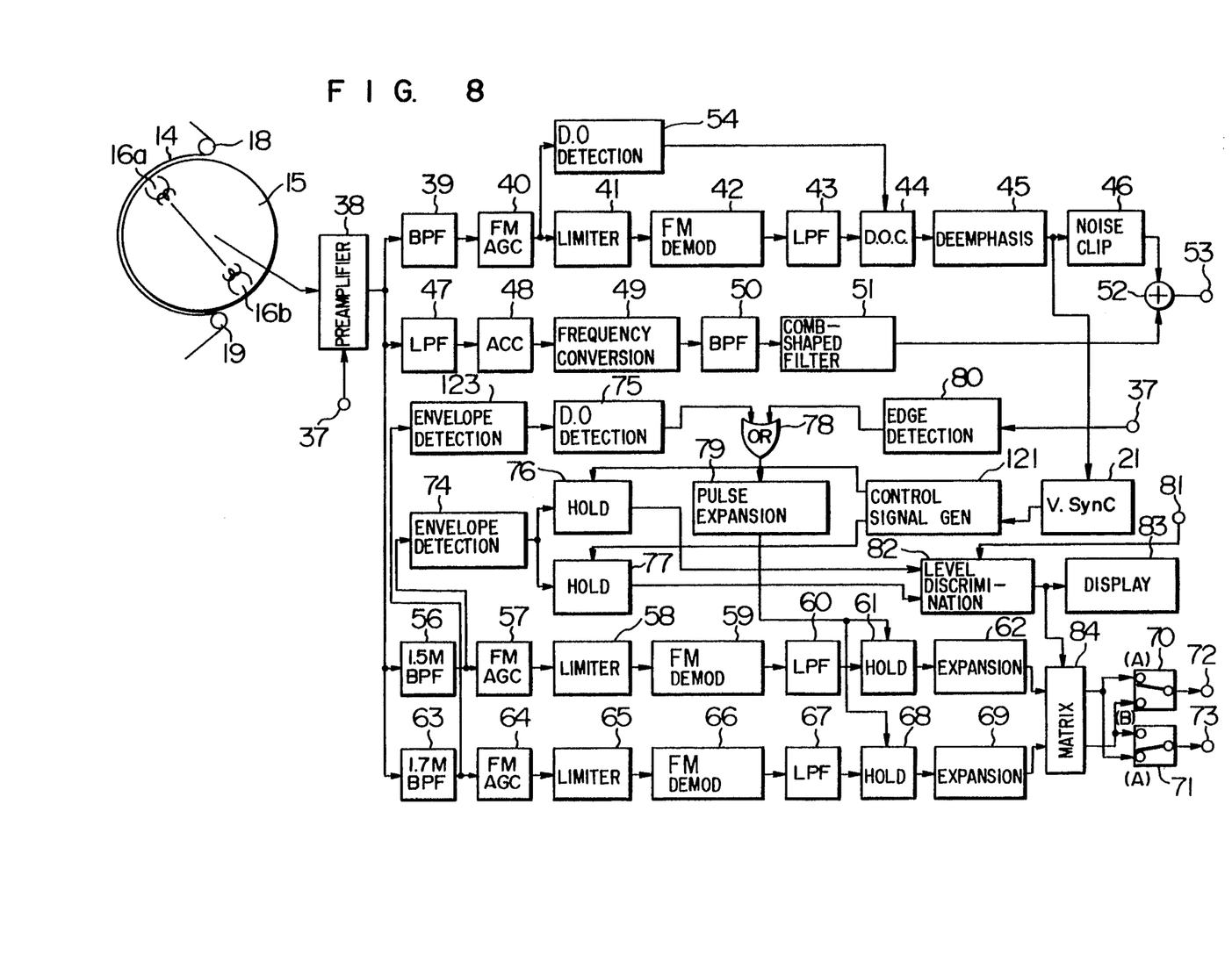
FIG. 8 is a block diagram showing another example of the reproducing system.

An embodiment of the other reproducing system is shown in FIG. 8.

In FIG. 8, the parts and components having the same functions as those in FIG. 4 are designated by the same reference numerals and, therefore, only the portions different from FIG. 4 will now be described.

First, FIG. 8 differs from FIG. 4 with respect to a point that an envelope detecting circuit 123 to detect a signal dropout and the envelope detecting circuit 74 to discriminate the content of the recorded audio signals are separated.

As a circuit to detect the signal dropout, there is used the envelope detecting circuit 123 which receives the FM audio signal on the high frequency side which is easily influenced by a spacing loss or the like, that is, the reproduced FM audio signal of a carrier center frequency of 1.7 MHz. On the other hand, as a circuit to discriminate the content of the recorded audio signals, there is used the envelope detecting circuit 74 which receives the reproduced FM audio signal of the carrier center frequency of 1.5 MHz on the low frequency side in which the reproduced FM audio signal level is hardly influenced by the spacing loss or the like. On the other hand, a control signal generating circuit 121 to generate control signals of the sample and hold circuits 76 and 77 operates on the basis of the vertical sync signal which was separated from the sync signal of the reproduced luminance signal by a vertical sync signal separating circuit 21.

Figure 9:
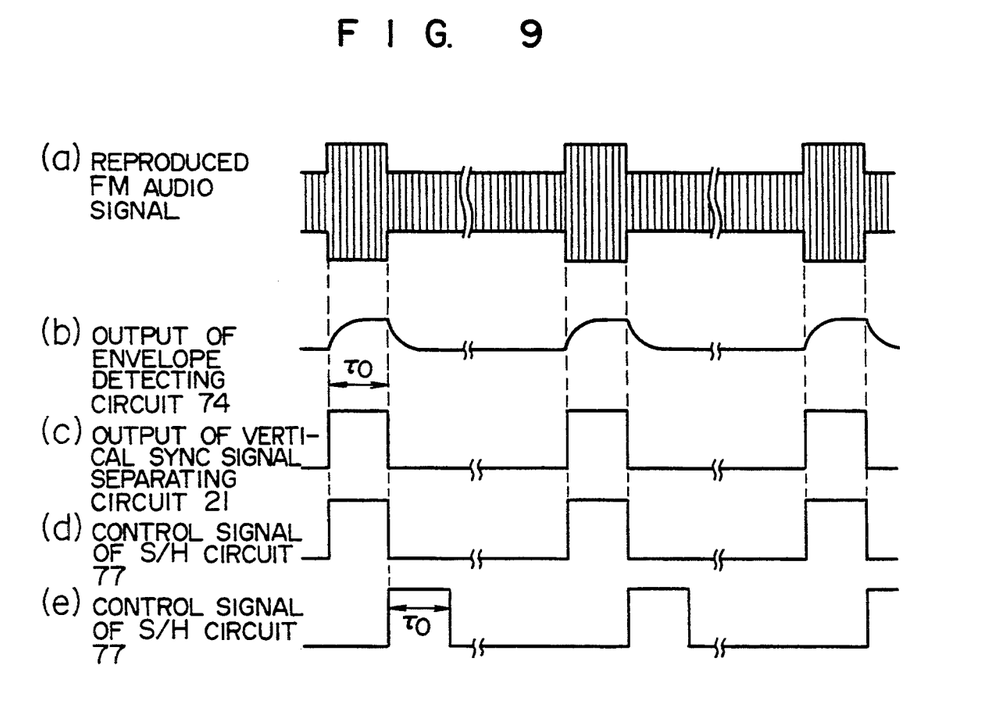
FIG. 9 is a waveform diagram for explaining the operation of FIG. 8.

On the other hand, in the control signal generating circuit 121, in order to prevent the erroneous operation in the discrimination of the content of the recorded audio signals due to an amplitude level fluctuation (for instance, the amplitude level near the vertical sync signal decreases) of the reproduced FM audio signal by a curved track in the compatible reproduction or the like, as shown in FIGS. 9(d) and 9(e), sampling and holding ranges of the output signal (FIG. 9(b)) of the envelope detecting circuit 74 for the vertical sync signal period and just after the vertical sync signal period are set to the portion of the same period $\tau_0$.

FIG. 9(a) shows a reproduced FM audio signal of a tape on which the bilingual audio signals were recorded. FIG. 9(c) shows an output signal of the vertical sync signal separating circuit 21.

By limiting the amplitude level detecting range of the reproduced FM audio signal, the erroneous discrimination which is caused due to the compatible reproduction and other reproduction amplitude fluctuation can be prevented.

Figure 10:
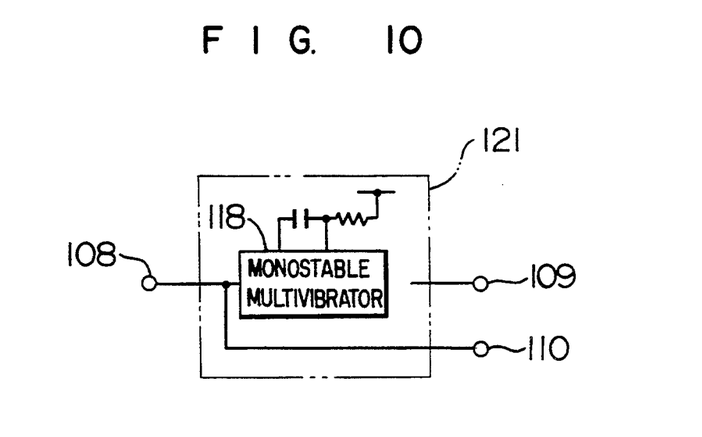
FIG. 10 is an arrangement diagram showing an example of a practical construction of FIG. 8.

FIG. 10 shows a practical example of the control signal generating circuit. The trailing edge of the output signal (FIG. 9(c)) of the vertical sync signal separating circuit 21 which was input from an input terminal 108 is used as a trigger and a monostable multivibrator 118 operates for the same period as the vertical sync signal period shown in FIG. 9(c). An output signal (FIG. 9(e)) of the monostable multivibrator 118 and the vertical sync signal (FIG. 9(c)) are output from output terminals 109 and 110 as sample and hold control signals of the sample and hold circuits 76 and 77.

On the other hand, in FIG. 8 of the above embodiment, as a control signal generating circuit 121, there has been shown an example in which a sample and hold control signal (FIG. 9(e)) for the same period as the vertical sync signal period is generated just after the vertical sync signal. However, as shown in FIG. 9(b), the envelope detecting circuit 74 has a time constant and the amplitude level of the reproduced FM audio signal follows a change, so that a predetermined time delay occurs.

Figure 11:
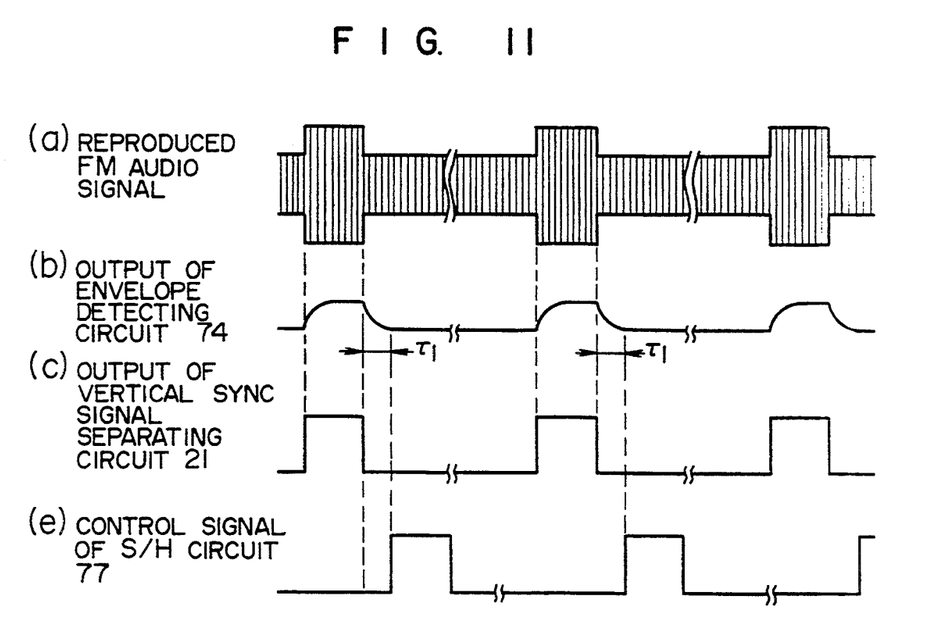
FIG. 11 is a waveform diagram for explaining another operation of FIG. 8.

Therefore, as shown in FIG. 11, it is also possible to construct such that the sample and hold control signal (FIG. 11(e)) which is generated after the vertical sync signal period is delayed by only the time ($\tau_1$ in FIG. 11(b)) corresponding to the time delay of the envelope detecting circuit 74.

Figure 12:
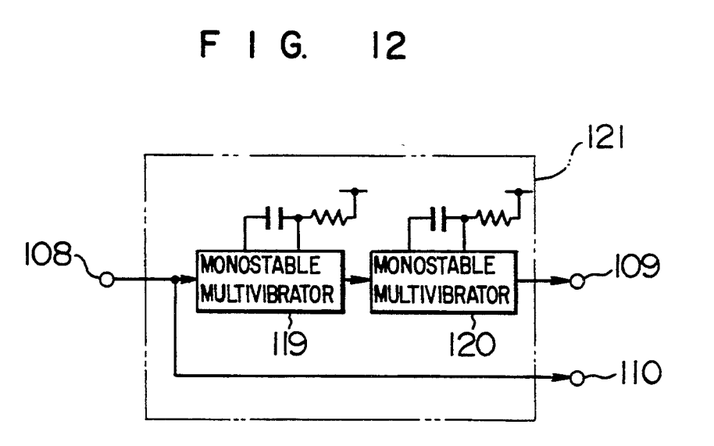
FIG. 12 is a block diagram showing an example of a control signal generating circuit.

FIG. 12 shows a practical arrangement example of the control signal generating circuit 121 to generate operation pulses shown in FIG. 11.

The trailing edge of the vertical sync signal (FIG. 11(c)) which is input from the input terminal 108 is used as a trigger and pulses having the time width $\tau_1$ are generated by a monostable multivibrator 119. The trailing edge of the pulses is used as a trigger and the sample and hold pulses having the pulse width $\tau_0$ are generated and output from the output terminal 109.

We claim:

1. An audio signal recording and reproducing apparatus in which a frequency modulated luminance signal and a frequency modulated audio signal are sequentially multiplexingly recorded and reproduced onto/from a same magnetic tape as recording track each having a predetermined angle of inclination for a tape running direction by a plurality of rotary heads having different azimuth angles, an audio signal recording and reproducing apparatus comprising:

means for increasing a recording level of the frequency modulated audio signal for a vertical sync signal period of the luminance signal:

first detecting means for detecting a reproducing level for the vertical sync signal period of the reproduced frequency modulated audio signal;

second detecting means for detecting a reproducing level for a period other than the vertical sync signal period;

means for comparing output levels of the first and second detecting means; and means for making the second detecting means operative on the side after the vertical sync signal for the same period as the vertical sync signal period.

2. An audio signal magnetic recording and reproducing apparatus according to claim 1, further comprising:

means for operating the first detecting means only during a predetermined period of the reproduced vertical sync signal period; and means for operating the second detecting means after the reproduced vertical sync signal period and during the same period as the operating period of said first detecting means.

3. An audio signal magnetic recording and reproducing apparatus according to claim 2, wherein said means for operating the first and the second detecting means operates in accordance with a pulse formed on the basis of a head switching signal.

4. An audio signal magnetic recording and reproducing apparatus according to claim 2, wherein said means for operating the first and the second detecting means operate in accordance with a pulse formed on the basis of the reproduced vertical sync signal.

5. An audio signal magnetic recording and reproducing apparatus in which a frequency modulated luminance signal and a frequency modulated audio signal are sequentially recorded and reproduced onto/from a same magnetic tape as recording loci each having a predetermined angle of inclination for a tape running direction by a plurality of rotary heads having different azimuth angles, comprising:
  means for increasing a recording level of the frequency modulated audio signal for a vertical sync signal period of the luminance signal;
  envelope detecting means for detecting an amplitude level of the reproduced frequency modulated audio signal;
  first means for sampling and holding a signal for the vertical sync signal period in an output signal of the envelope detecting means;
  second means for sampling and holding an envelope detection output for the same period as the vertical sync signal period on the side after the vertical sync signal;
  means for comparing outputs of the first and second sample and hold means; and
  display means for displaying a content corresponding to an output level of the comparing means.

6. An audio signal magnetic recording and reproducing apparatus according to claim 5, wherein the first and second means for sampling and holding operate in accordance with a pulse formed on the basis of a head switching signal.

7. An audio signal magnetic recording and reproducing apparatus according to claim 5, wherein the first and the second means for sampling and holding operate in accordance with a pulse formed on the basis of the reproduced vertical sync signal.

8. An audio signal magnetic recording and reproducing apparatus in which a frequency modulated audio signal is frequency multiplexed between a frequency modulated luminance signal and a low band converted chrominance signal and those signals are sequentially recorded and reproduced onto/from a same magnetic tape as recording loci each having a predetermined angle of inclination for a tape running direction by a plurality of rotary heads having different azimuth angles, comprising:
  matrix means for making a sum signal and a difference signal from a right side signal and a left side signal of stereophonic audio signals and for allowing bilingual audio signals to pass in a recording mode;
  means for increasing a recording level of the frequency modulated audio signal for a vertical sync signal period;
  envelope detecting means for detecting an amplitude level of the reproduced frequency modulated audio signal;
  first means for sampling and holding a signal for the vertical sync signal period in an output signal of the envelope detecting means;
  second means for sampling and holding an envelope detection output for the same period as the vertical sync signal period on the side after the vertical sync signal period;
  means, for comparing output levels of the first and second sample and hold means;
  means for controlling the matrix means on the reproducing side by an output signal of the comparing means; and
  means for comparing the output signal of the comparing means.

9. An audio signal magnetic recording and reproducing apparatus according to claim 8, wherein the first and the second means for sampling and holding operate in accordance with a pulse formed on the basis of a head switching signal.

10. An audio signal magnetic recording and reproducing apparatus according to claim 8, wherein the first and the second means for sampling and holding operate in accordance with a pulse formed on the basis of the reproduced vertical sync signal.

11. An audio signal recorder comprising:
  a frequency modulator supplied with an audio signal to be recorded for generating an FM audio signal;
  two magnetic heads mounted on a cylinder for recording a record signal applied thereto on a magnetic tape as oblique tracks, alternately, in response to a head switching pulse;
  signal transfer means connected between said frequency modulator and said magnetic heads, for transferring said FM audio signal as said record signal to said magnetic heads with first and second gains;
  detecting means for detecting whether said audio signal to be recorded has a special format or not and for generating a detection signal when the special format is detected; and
  control means responsive to said detecting means for choosing said gains in said transfer means so that said second gain is chosen during a predetermined initial period in each head switching pulse period and said first gain is chosen during the remaining period in each head switching pulse period when said detection signal is generated by said detecting means and that said first gain is chosen for an entire duration in each head switching period when said detection signal is not generated by said detecting means.

12. An audio signal reproducing apparatus comprising:
  magnetic heads for reproducing a frequency modulated audio signal from a magnetic tape on which the frequency modulated audio signal was recorded in a manner such that a recording level of the frequency modulated audio signal for a vertical sync signal period of a luminance signal which is simultaneously recorded is made different in accordance with a format of audio signals to be recorded;
  a discriminating circuit to discriminate an amplitude of the reproduced frequency modulated audio signal which was output from the magnetic heads for the vertical sync signal period of the reproduced luminance signal; and
  a processing circuit to process the reproduced frequency modulated audio signal in accordance with an output of the discriminating circuit,
  wherein the discriminating circuit operates in accordance with a pulse formed on the basis of a head switching signal.

13. An audio signal reproducing apparatus comprising:

magnetic heads for reproducing a frequency modulated audio signal from a magnetic tape on which the frequency modulated audio signal was recorded in a manner such that a recording level of the frequency modulated audio signal for a vertical sync signal period of a luminance signal which is simultaneously recorded is made different in accordance with a format of audio signals to be recorded;

a discriminating circuit to discriminate an amplitude of the reproduced frequency modulated audio signal which was output from the magnetic heads for the vertical sync signal period of the reproduced luminance signal; and a processing circuit to process the reproduced frequency modulated audio signal in accordance with an output of the discriminating circuit;

wherein the discriminating circuit operates in accordance with a pulse formed on the basis of the reproduced vertical sync signal.

14. An audio signal magnetic recording and reproducing apparatus in which a frequency modulated luminance signal and a frequency modulated audio signal are sequentially multiplexingly recorded and reproduced onto/from a same magnetic tape as recording loci each having a predetermined angle of inclination for a tape running direction by a plurality of rotary heads having different azimuth angles, comprising:

means for increasing a recording level of the frequency modulated audio signal for a vertical sync signal period of the luminance signal;

first detecting means for detecting a reproducing level for the vertical sync signal period of the reproduced frequency modulated audio signal;

second detecting means for detecting a reproducing level of the reproduced frequency modulated audio signal for a period excluding the vertical sync signal period; and means for comparing output levels of the first and second detecting means.

* * * * *